US012170867B2

(12) United States Patent
Pundak

(10) Patent No.: US 12,170,867 B2
(45) Date of Patent: Dec. 17, 2024

(54) EARBUD LOCATION DETECTION BASED ON ACOUSTICAL SIGNATURE WITH USER-SPECIFIC CUSTOMIZATION

(71) Applicant: Microsoft Technology Licensing, LLC, Redmond, WA (US)

(72) Inventor: Gilad Pundak, Rehovot (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 114 days.

(21) Appl. No.: 17/745,214

(22) Filed: May 16, 2022

(65) Prior Publication Data

US 2023/0370760 A1 Nov. 16, 2023

(51) Int. Cl.
*H04R 29/00* (2006.01)
*G10L 25/51* (2013.01)
(Continued)

(52) U.S. Cl.
CPC ............ *H04R 1/1041* (2013.01); *G10L 25/51* (2013.01); *G10L 25/78* (2013.01); *H04R 1/08* (2013.01);
(Continued)

(58) Field of Classification Search
CPC ...... H04R 1/1041; H04R 1/08; H04R 1/1016; H04R 1/1075; G10L 25/51; G10L 25/78
See application file for complete search history.

(56) References Cited

U.S. PATENT DOCUMENTS 9,706,304 B1 7/2017 Kelso et al.
9,883,278 B1 1/2018 Lin et al.
(Continued)

FOREIGN PATENT DOCUMENTS

CN 108810860 A 11/2018
CN 111666549 A 9/2020
(Continued)

OTHER PUBLICATIONS

"International Search Report and Written Opinion Issued in PCT Application No. PCT/US23/013390", Mailed Date: Jun. 15, 2023, 12 Pages.

(Continued)

*Primary Examiner* — Simon King
(74) *Attorney, Agent, or Firm* — Weaver IP L.L.C.

(57) ABSTRACT

An earbud is configured to detect its location (e.g., in-ear and out-of-ear) based on an acoustical signature with and without user-specific customization. The earbud location may be indicated to a host, e.g., to determine playback. Location determinations are based on features extracted from acoustical samples taken by the earbud compared to features extracted from out-of-ear acoustical samples and non-user-specific and/or user-specific in-ear samples. A non-user-specific machine learning (ML) model trained on features extracted from non-user-specific in-ear and out-of-ear samples may be an initial/default locator. The non-user-specific model may be customized for specific users. A user-specific in-model may be created by training the non-user-specific model on features extracted from user-specific in-ear samples collected when the earbud is located in-ear for a specific user. The user-specific ML model may be selected to classify a location of the earbud for one or more associated hosts.

20 Claims, 7 Drawing Sheets

(51) Int. Cl.
*G10L 25/78* (2013.01)
*H04R 1/08* (2006.01)
*H04R 1/10* (2006.01)

(52) U.S. Cl.
CPC ......... *H04R 1/1016* (2013.01); *H04R 1/1075* (2013.01)

(56) References Cited

U.S. PATENT DOCUMENTS

| | | | |
|---|---|---|---|
| 9,942,222 B1 | 4/2018 | Fenton et al. | |
| 10,757,500 B2 | 8/2020 | Kemmerer et al. | |
| 2009/0067661 A1* | 3/2009 | Keady | H04R 1/1091 381/375 |
| 2009/0071486 A1* | 3/2009 | Perez | H04R 25/652 128/858 |
| 2015/0245129 A1* | 8/2015 | Dusan | G10L 21/0208 381/71.6 |
| 2016/0050204 A1 | 2/2016 | Anderson | |
| 2016/0294817 A1 | 10/2016 | Tan et al. | |
| 2017/0078785 A1 | 3/2017 | Qian et al. | |
| 2017/0150269 A1 | 5/2017 | Li et al. | |
| 2017/0215011 A1* | 7/2017 | Goldstein | H04R 25/305 |
| 2017/0333755 A1 | 11/2017 | Rider | |
| 2019/0230426 A1 | 7/2019 | Chun | |
| 2021/0073362 A1 | 3/2021 | Alameh et al. | |
| 2021/0368254 A1* | 11/2021 | Kemmerer | G06F 3/017 |
| 2022/0417675 A1* | 12/2022 | Rottier | H04R 25/305 |
| 2024/0196125 A1 | 6/2024 | Arbel | |

FOREIGN PATENT DOCUMENTS

| | | | | |
|---|---|---|---|---|
| EP | 2415276 B1 | 8/2015 | | |
| EP | 2742700 B1 | 7/2018 | | |
| WO | WO-2017203484 A1 * | 11/2017 | | G06F 3/165 |
| WO | WO-2021123758 A2 * | 6/2021 | | H04R 1/04 |
| WO | 2022020034 A1 | 1/2022 | | |

OTHER PUBLICATIONS

Mlynski, Rafal, "Headphone Audio in Training Systems or Systems That Convey Important Sound Information", In International Journal of Environmental Research and Public Health, vol. 19, Issue 5, Feb. 23, 2022, 13 Pages.

Takayuki, Arakawa, "Ear Acoustic Authentication Technology: Using Sound to Identify the Distinctive Shape of the Ear Canal", In Journal of NEC Tech.-Special Issue Social Value Creation Using Biometrics, vol. 13, Issue 2, Apr. 2019, 7 Pages.

International Search Report and Written Opinion received for PCT Application No. PCT/US2023/035653, mailed on Dec. 22, 2023, 15 pages.

* cited by examiner

EARBUD LOCATION DETECTION BASED ON ACOUSTICAL SIGNATURE WITH USER-SPECIFIC CUSTOMIZATION

BACKGROUND

Earbuds may use proximity sensors to determine whether the earbuds are located in-ear. The proximity sensors are used to determine an "in-ear" status based on a detected proximity to a surface. A host device, such as a smart phone coupled to the earbud, may make determinations based on an in-ear detection made by the proximity sensor.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for earbud location detection based on an acoustical signature with user-specific customization. The location of an earbud may be determined as one of a plurality of locations, such as in-ear and out-of-ear locations, based on a comparison of features extracted from one or more acoustical samples taken by the earbud to features extracted from (e.g., historical, non-user-specific) in-ear and out-of-ear acoustical samples. The determined location may be indicated in a communication to a host device (e.g., smart phone) connected, wirelessly or by wire, to the earbud, e.g., to enable/disable host playback through the earbud. A non-user-specific machine learning (ML) model in the earbud may be selected (e.g., initially) to classify locations of the earbud. The non-user-specific ML model may be trained on features extracted from non-user-specific samples. The non-user-specific ML model may be customized for specific earbud users. User-specific in-ear samples may be collected when the earbud is detected to be in-ear by the non-user-specific model. The non-user-specific ML model may be trained on features extracted from the user-specific in-ear samples to create a user-specific ML model. The user-specific ML model may be associated with one or more host devices that connect to the earbud. The user-specific ML model may be selected to classify a location of the earbud for the associated host(s).

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1A:
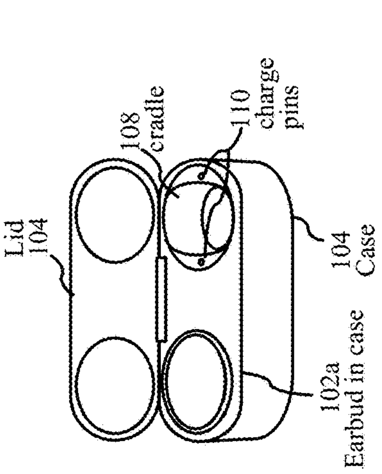
FIGS. 1A-1D show examples of an earbud in different locations, according to embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

As described above, earbuds may include proximity sensors, such as IR (infrared) sensors, capacitive sensors, mechanical sensors, thermal sensors, etc., to determine whether the earbuds are located in-ear, which can be used to determine an "in-ear" status based on a detected proximity to a surface. The proximity sensors may erroneously indicate an earbud is located in-ear when, in fact, the earbud is not in an ear but is instead resting on a table, in a hand, held in fingers, in a pocket, or adjacent to another surface other than an ear. A host device, such as a smart phone coupled to the earbud, may make determinations based on an in-ear detection made by the proximity sensor. When an earbud is erroneously determined to be in an ear even though it is not, the host device may make an erroneous decision to engage in playback with the earbud, which wastes stored power in the host battery and earbud battery.

Embodiments overcome these and other limitations of earbuds implementing conventional location determining techniques. For instance, methods, systems, and computer program products are disclosed herein for earbud location detection based on an acoustical signature with user-specific customization. The location of an earbud is determined as one of a plurality of locations, which include in-ear and/or out-of-ear locations, based on a comparison of features extracted from one or more acoustical samples taken by the earbud to features extracted from (e.g., historical, non-user-specific) in-ear and out-of-ear acoustical samples. The determined location may be indicated in a communication transmitted to a host device (e.g., smart phone) connected, wirelessly or by wire, to the earbud.

In a further aspect, a non-user-specific machine learning (ML) model in the earbud is selected (e.g., initially) to classify locations of the earbud. The non-user-specific ML model may be trained on features extracted from non-user-specific samples. In this manner, the earbud, using the non-user-specific ML model, is enabled to make a location (e.g., in-ear) determination for a user using the earbud for a first time with at least some accuracy. Subsequently, the non-user-specific ML model may be customized for one or more specific earbud users to increase its accuracy at making location determinations. User-specific in-ear samples are collected when the earbud is detected to be in-ear by the non-user-specific model. The non-user-specific ML model may be trained on features extracted from the user-specific in-ear samples to create a user-specific ML model. The user-specific ML model may be associated with one or more host devices that are coupled to the earbud. The user-specific ML model may be selected to classify a location of the earbud for the associated host(s). Note that the terms earbud and earphone may be used interchangeably herein.

Acoustical in-ear detection provides in-ear classification that is more robust (e.g., accurate) than enabled by proximity sensors. Acoustical in-ear detection is capable of supporting many variations in ear canals for different users. Acoustical in-ear detection can distinguish and reject surfaces other than ear canals. A non-user-specific machine learning (ML) model may be trained on non-user-specific (e.g., non-customized or general) in-ear and out-of-ear samples from different users with different ear shapes and a variety of out-of-ear surfaces. A non-user-specific model may be used as a default model. A non-user-specific ML model may be referred to as an "offline" model, where "online" refers to performing machine learning while an earbud is located in-ear and in-use by a user, performing user-specific acoustical sampling and training with user-specific samples a user-specific ML model based on user-specific learning.

A user-specific (e.g., online) learning mechanism may be implemented with supervised transfer learning. User-specific learning may start with the non-user-specific (e.g., offline) model as the initial condition. The non-user-specific (e.g., offline) model may be used as ground truth to develop a user-specific model. The model parameters may be fine-tuned (e.g., customized) using user-specific (e.g., online) acoustical samples/examples. Acoustical samples may use ultrasonic sound waves, which may be agnostic to skin color (e.g., in contrast to IR proximity sensors that may vary in accuracy based on light reflection).

In some examples, the MAC address of a (e.g., each) host device may be used to map a user-specific (e.g., an online) model to a user. Multiple MAC addresses may be mapped to the same user (e.g., where a user uses a smartphone, a PC, a tablet, etc. with earbuds).

A control mechanism (e.g., locator control logic in an earbud) may switch from a user-specific ML model to a non-user-specific (e.g., offline) ML model (e.g., for a period of time), for example, after encountering one or more threshold errors or out-of-bounds (e.g., unexpected) data (e.g., within a given period of time). The offline model may be used, for example, until the earbud is determined by the non-user-specific model to be located out-of-ear due to an ear no longer being detected. For example, a user may temporarily allow a friend to use an earbud with a significantly different ear canal. This type of control may support creating an additional user-specific model for the friend, which may be associated with one or more host devices.

In example implementations, acoustical earphone detection (e.g., with or without customization) may provide a technique for control of the audio output provided by an earphone and/or for control of audio signal transmission to the earphone by a communicatively coupled computing device (e.g., host). As indicated, earphone detection may be customized/developed specifically for a user of the earphone. Earphones may be wirelessly connectable to a computing device (e.g., referred to as a host device). Initial use of earphones may use a non-customized (e.g., non-user-specific, default or standard) earphone location detector and/or control model for the host device and/or earphone. For example, the earphone audio output (e.g., through a speaker) and/or host transmission of an audio signal may be controlled based on a determination of earphone location (e.g., using a customized or a non-customized location determination and/or control model). A host device may not transmit an audio signal and/or an earphone may not output sound, for example, without a determination that the earphone is in use (e.g., located in-ear).

In example implementations, an earphone location determination and/or a host and/or earphone control model may be improved by user-specific customization that improves the accuracy of earphone location determinations and, therefore, host and/or earphone control based on location determinations. A non-customized model may be improved one or more times (e.g., "continuously") for a specific user. User-specific in-ear data (e.g., acoustical samples) may be gathered. The data gathered may include data collected during the playing of music through the earphone, data collected when the earphone is providing speaking output, and data collected when the earphone is not providing any audio output. The data collected may be used to customize the earphone detection and/or control model(s) for earphone and/or host devices. Examples described herein may be implemented in each earphone/earbud in a pair, such that each earbud and/or host device may make determinations whether to enable audio output and/or transmit an audio signal according to the determined location of each earphone/earbud.

Figure 1B:
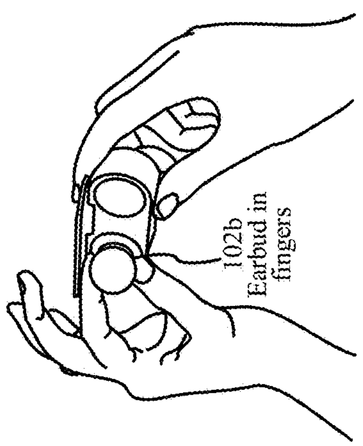
Figure 1C:
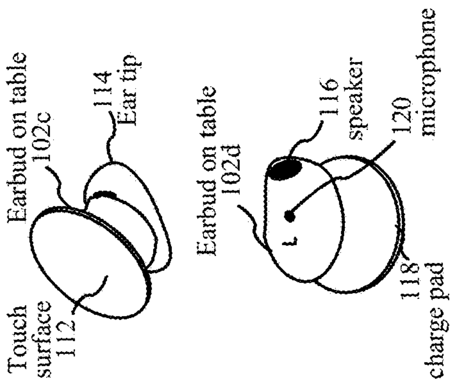
Figure 1D:
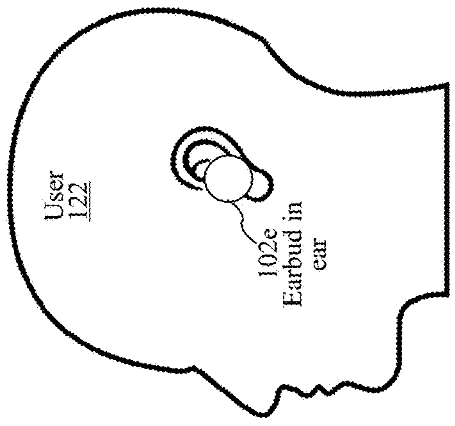

FIGS. 1A-1D show examples of an earbud in different locations, according to embodiments. For instance, FIG. 1A shows an example of earbud 102 in a charging case location 102*a*. FIG. 1B shows an example of earbud 102 in a user's fingers location 102*b*. FIG. 1C shows an example of earbud 102 on a table location in a first position 102*c* and on a table location in a second position 102*d*. FIG. 1D shows an example of earbud 102 in an in-ear location 102*e*. As previously indicated, proximity detection may be unable to accurately distinguish one or more locations shown in FIGS. 1A-1C from the in-ear location shown in FIG. 1D. Acoustical detection described herein may be able to accurately distinguish one or more locations shown in FIGS. 1A-1C from the in-ear location shown in FIG. 1D, which may, for example, conserve battery power in earbuds and/or host devices relative to conventional earbuds that implement proximity detection.

Charging case 104 may provide storage and charging for earbuds 102. Case 104 may include a lid 104, a cradle 108, one or more charge pins 110, a case battery (not shown), etc.

Earbud(s) 102 may include, for example, a touch surface 112, an ear tip 114, a speaker 116, one or more microphones 120, one or more charge pads 118 and a system on a chip (SoC) (not shown in FIGS. 1A-1D). Touch surface 112 may provide a user interface for user 122 to interact with earbud 102. For example, touch surface 112 may have multiple functions a user may select by a one or more (e.g., a combination of) taps, holds and/or finger presses of touch surface 112. Ear tip 114 may be fixed or variable (e.g., removable/replaceable), for example, to fit a variety of sizes and shapes of user ear canals. Speaker(s) 116 may emit sound waves based on audio signals (e.g., encoded and decoded by an audio coder/decoder (CODEC) of audio IO interface 212), such as music, movie audio, phone call audio, acoustical test signals (e.g., inaudible chirps) to generate echoes and in-ear samples to develop an acoustical profile for user 122, etc. One or more (e.g., all) audio signals may be generated by earbud 102 and/or host (not shown in FIGS. 1A-1D). Charge pad(s) 118 may mate with charge pins 110 in case 104 to charge an earbud battery (not shown in FIGS. 1A-1D) in earbud 102 by a case battery and/or charger (not shown in FIGS. 1A-1D) in or attached to case 104. Microphone 120 is representative of one or more microphones in earbud 102. For example, earbud 102 may have one or more feed forward (FF) microphones (e.g., used for audio features), which may be used, for example, to detect the voice of user 122 and/or other sounds external to user 122. Earbud 102 may have one or more feedback (FB) microphones (e.g., used for active noise cancellation), which may be used to detect echoes for acoustical test signals (e.g., inaudible chirps) to develop in-ear samples for an acoustical profile for user 122, determine current earbud location, etc.

Figure 2:
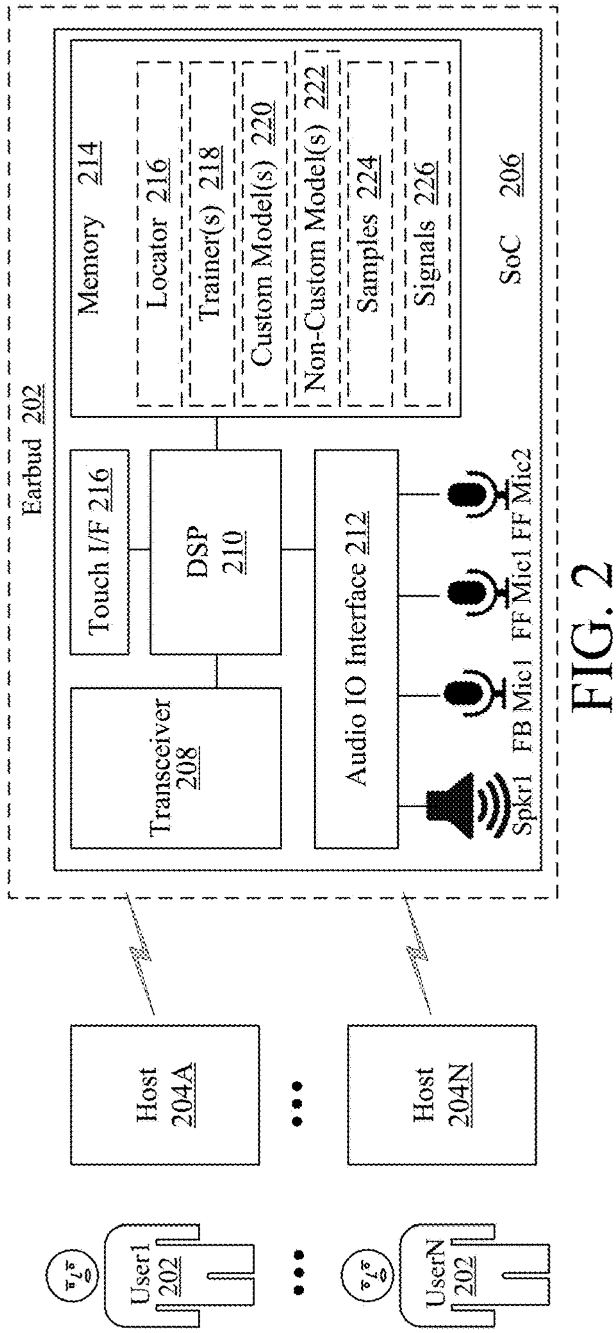
FIG. 2 shows an example of an earbud communicatively coupled/connected to one or more host devices and users who may interact with the earbud and host device(s), according to an embodiment.

FIG. 2 shows an example of an earbud 202 communicatively coupled/connected to host device(s) and user(s) who may interact with the earbud and one or more host devices, according to an example embodiment. As shown in FIG. 2, earbud 202 may be communicatively coupled/connected (e.g., wirelessly, such as by a Bluetooth® connection) to one or more host devices hosts 204A-204N. One or more users user1-N 202 may interact with earbud 202 and one or more hosts 204A-204N. FIG. 2 presents several of many computing environments that may implement subject matter described herein.

Hosts 204A-204N may each comprise any type of computing device. Each of hosts 204A-204N may be, for example, any type of stationary or mobile, wired or wireless, computing device, such as a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., "smart phone"), a wearable computing device, or other type of mobile device, or a stationary computing device such as a desktop computer or PC (personal computer), or a server. Hosts 204A-204N may each comprise one or more applications, operating systems, virtual machines, storage devices, etc. that may be executed, hosted, and/or stored therein or via one or more other (e.g., networked) computing devices. In an example, each of hosts 204A-204N may access one or more server computing devices (e.g., over a network). An example computing device with example features is presented in FIG. 8, which is described in detail below. Hosts 204A-204N may each execute one or more applications that may generate an audio signal to be output as sound waveforms by speaker(s) 116, such as a music playback application, a streaming service application, an audio phone call application, an audio/video phone call application, social media applications, a communication pairing application to pair with earbud 202, a communication application to communicate with earbud 202. One or more applications executed by hosts 204A-204N may rely on a location status of earbud 202 (e.g., generated by locator 216), etc.

Hosts 204A-204N may each communicate with one or more networks. A network (not shown) may include, for example, any of a local area network (LAN), a wide area network (WAN), a personal area network (PAN), a combination of communication networks, such as the Internet, and/or a virtual network. In example implementations, hosts 204A-204N may be communicatively coupled via one or more networks to one or more private or public resources (e.g., servers). Resources, such as servers and hosts 204A-204N may each include at least one network interface that enables communications over one or more networks. Examples of a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described below. Server(s) (not shown) may comprise one or more servers, such as one or more application servers, database servers, authentication servers, etc. Server(s) may support interaction with hosts 204A-204N. Server(s) may serve data (e.g., streaming music, movies, social media, network-based audio/video call data, etc.) and/or programs to hosts 204A-204N.

Earbud 202 may include, for example, a SoC 206. SoC 206 may include, for example, a transceiver 208, a digital signal processor (DSP) 210, an audio IO (input-output) interface 212, a memory 214, a touch interface (I/F) 216, at least a first speaker Spkr1, a first feedback (FB) Microphone (Mic) Mic1, and first and second feed forward (FF) microphones Mic1 and Mic2. The example shown in FIG. 2 is not intended to show all components in earbud 202 and/or SoC 206. Various implementations of earbuds may have more, fewer, the same or different components.

Transceiver 208 may transmit and receive communications with hosts 204A-204N earbud case (e.g., as shown in FIGS. 1A-1B). Transceiver 208 may be part of a communication manager (not shown), which controls one or more communication links/channels between earbud 202 and hosts 204A-204N. Transceiver 208 may include, for example, transmitter/receiver circuitry, which may include one or more antennas, impedance matching circuitry, etc. Transceiver 208 may be configured to support one or more communications, such as Bluetooth®, near field communication (NFC), etc. For example, an earbud case may communicate power and/or data to earbud 202 (e.g., and earbud 202 may communicate data to an earbud case) using NFC (e.g., in which case charge pins 110 and charge pads 118 may be unnecessary. For example, hosts 204A-204N and earbud 202 may communicate using a Bluetooth® connection/link/channel.

Digital signal processor (DSP) 210 may execute program code in memory 214, such as program code for locator 216, trainer(s) 218, custom model(s) 220, and non-custom model (s) 222. Memory 214 does not show all program code executed by DSP 210. DSP 210 may process data to/from transceiver 208, touch I/F 216, audio IO interface 212, etc., for example, in accordance with executable code from one or more programs in memory 214. Examples of processing (e.g., of executable program instructions) performed by DSP 210 is shown in FIGS. 3-5 and 7.

Audio IO interface 212 may provide audio coding and decoding for audio signals received from DSP 210, first speaker Spkr1, first feedback microphone FB Mic1, first and/or second feed forward microphones FF Mic1, FF Mic2, etc. An encoder may encode a signal/data stream (e.g., echo signal generated by FB Mic1) for storage (e.g., as a file, such as an in-ear or out-of-ear sample) or transmission. A decoder may decode a signal/data stream (e.g., received from transceiver 208 or a file accessed from storage (e.g., memory 214).

Touch interface (I/F) 216 may sense and process interaction by user 122 with touch surface 112. Touch I/F 216 may generate executable instructions (e.g., flags or interrupts) for handling by DSP 210. For example, a detected user interaction may cause touch I/F 216 to instruct DSP 210 to change a state of operation of earbud 202 in a state machine, such as from playback of audio provided by host 204 to stop playback or vice versa.

First speaker Spkr1 may emit sound waves based on audio signals (e.g., encoded and decoded by a CODEC of audio IO interface 212), such as music, movie audio, phone call audio, acoustical test signals (e.g., inaudible chirps) to generate echoes and in-ear samples to develop an acoustical profile for user 122, etc. For example, locator 216 may include sample generator code executed by DSP 210 that provides to audio IO interface 212 for output by first speaker Spkr1 signals 226 alone and/or in combination with an audio data stream from host 204.

First FB microphone Mic1, detect echoes for acoustical test signals (e.g., inaudible chirps) to develop in-ear samples for an acoustical profile for user 122, etc. Detection of echoes to generate an acoustical profile for a particular user is not performed by conventional techniques that use proximity detection to determine earbud location. Audio IO interface 212 may sample and code the signal(s) generated by first FB microphone Mic1 for processing by DSP 210 in accordance with executable program code. For example, locator 216 may include sample generator program to generate samples 224.

First FF microphone Mic1 and/or second FF microphone Mic2 may detect the voice of user 122 and/or other sounds external to user 122. Audio IO interface 212 may sample and code the signal(s) generated by first FF microphone Mic1 and/or second FF microphone Mic2 for processing by DSP 210 in accordance with executable program code.

Memory 214 may store programs (e.g., executable program code, such as for locator 216, trainer(s) 218, custom model(s) 220, and non-custom model(s) 222) and data (e.g., acoustic samples 224, acoustic test signals/patterns 226). Memory 214 may include one or more types of volatile and/or non-volatile memory (e.g., RAM (random access memory), ROM (read only memory), EEPROM (electrically erasable programmable ROM), flash memory) with or without one or more layers of cache memory. In some examples, memory 214 may include (e.g., only) non-volatile memory. In some examples, memory 214 may include volatile memory (e.g., RAM) and non-volatile memory (e.g., ROM), in which case programs may be loaded from ROM to RAM for execution by DSP 210.

Locator 216 may be an executable program that provides location functionality for earbud 202. Locator 216 may determine use of other components, such as one or more trainers 218, one or more custom models 220, one or more non-custom models 222, generation, storage, and/or access of samples 224, access of test signals 226, etc. Locator 216 may have one or more routines, subroutines, etc. that implement logic in the service of earbud location functionality. For example, locator 216 may have a current location routine and/or a test routine that (e.g., when executed by DSP 210) access signals 226 and provide them to audio IO interface 212 for output as audio waveforms through first speaker Spkr1 directly or indirectly (e.g., by mixing with other audio signals). The location and/or test routines executed by DSP 210 may expect to receive an echo data stream generated by audio IO interface 212 (e.g., sampling, amplifying, filtering and converting from analog to digital data) based on detection of echo signals by FB Mic1. Locator 216 may have a model selection routine (e.g., as shown by examples in FIG. 4 and FIG. 5), which may include a customization subroutine (e.g., as shown by example at 504 in FIG. 5). A model selection routine may select between custom model(s) 220 and non-custom model (s) 222 to perform location classification based on current (e.g., periodically taken) samples 224.

Trainer(s) 218 may include executable program(s) to train custom model(s) 220 and/or non-custom model(s) 222. For example, trainer(s) 218 may perform supervised machine learning using labeled acoustical samples 224 that indicate earbud location. Trainer(s) 218 may divide samples 224 (e.g., historical out-of-ear samples, non-user-specific in-ear samples, user-specific in-ear samples and/or based on solo or combined chirp signal samples with other audio under different scenarios) into training, testing, and evaluation/validation sets of samples to confirm prediction accuracy of custom model(s) 220 and/or non-custom model(s) 222 during and/or after training. Trainer(s) 218 may train non-custom model(s) 222 (e.g., initially and/or for customization) based on positive examples (e.g., based on features indicating in-ear location) and negative examples (e.g., based on features indicating out-of-ear location).

Non-custom model(s) 222 may each be a generalized model, an initial or factory model, default or fallback model used to determine the location of earbud 202. Non-custom model(s) 222 may be trained based on non-user-specific in-ear samples and out-of-ear samples in a variety of locations of earbud 202 or the same or similar type of earbud (e.g., for a production earbud). Trainer(s) 218 may train, test, and validate the classification accuracy of non-custom model(s) 222. Non-custom model(s) 222 may be, for example, a convolutional neural network (CNN) model, a long short-term memory (LSTM) model, or other suitable type of model.

Custom model(s) 220 may each be user-specific models trained on user-specific in-ear samples, non-user-specific in-ear samples, and out-of-ear samples in a variety of locations of earbud 202 or the same or similar type of earbud. In some examples, non-custom model(s) 222 may be used as ground truth in the development of custom model(s) 220. Non-custom model(s) 222 may be customized based on user-specific in-ear samples. Trainer(s) 218 may train, test, and validate the classification accuracy of custom model(s) 220. Custom model(s) 220 may be, for example, a convolutional neural network (CNN) model, a long short-term memory (LSTM) model, or other suitable type of model.

Samples 224 may include, for example, out-of-ear samples, non-user-specific in-ear samples, and/or user-specific in-ear samples. Samples 224 may include historical samples and/or current samples. Custom model(s) 220 and non-custom model(s) 222 may extract features from current samples to determine (e.g., classify with a probability) a current location of earbud 202 (e.g., as in-ear or out-of-ear). Examples of features that may be extracted from samples include standard deviation (STD), entropy, signal shape in the time domain, time domain peak relationships, frequency domain peak relationships, spectrum distribution, etc. Samples 224 may be stored as digital data in memory 214 of any suitable format.

Signals 226 may be used to generate samples 224. Signals 226 may include an indication of a test pattern for acoustical waveforms to be emitted by Spkr1 to generate echoes that may be used to create acoustical samples, which may be used by trainer(s) 218 to train a model or used by trained custom model(s) 220 or non-custom model(s) 222 to predict location. Signals 226 may include files storing data in a (pre)defined format for access by a sample generation routine in locator 216

Figure 3:
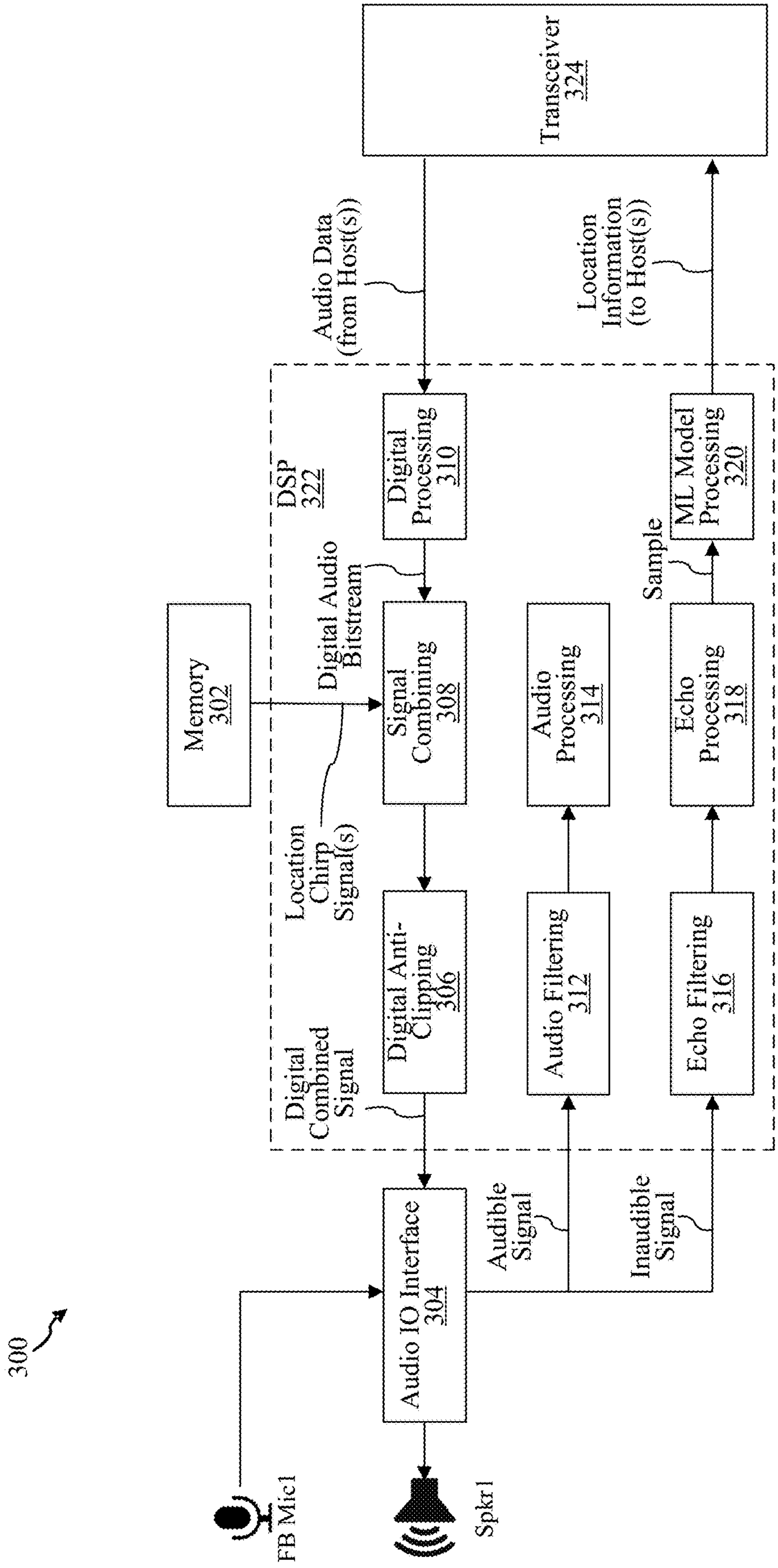
FIG. 3 shows a block diagram of earbud DSP (digital signal processing) operations in determining earbud location, according to an example embodiment.

FIG. 3 shows a block diagram example of an earbud 300 configured for earbud DSP operations in determining earbud location, according to an example embodiment. As shown in FIG. 3, earbud 300 includes memory 302, audio IO (input-output) interface 304, DSP 322, transceiver 324, FB Mic1, and Spkr1. DSP 322 includes logic (code and/or circuits) configured to operations that include digital anti-clipping 306, signal combining 308, digital processing 310, audio filtering 312, audio processing 314, echo filtering 316, echo processing 318, and ML model processing 320. Earbud 300 presents selected operations by earbud DSP 322 (e.g., based on executable instructions from one or more programs). For purposes of brevity, FIG. 3 is not intended to show all possible operations performed by earbud DSP 322.

As shown in FIG. 3, DSP 322 may receive audio data from one or more hosts (not shown), e.g., via transceiver 324. DSP 322 may (e.g., periodically) provide earbud location information to the host(s), e.g., via transceiver 324, for example, based on (e.g., periodic) acoustic sampling.

DSP 322 may perform digital processing 310 on audio data received from the host(s). For example, audio data from host(s) may be analog data. DSP may convert the analog data into a digital bitstream, e.g., to perform digital operations on the digital audio data bitstream.

DSP 322 may perform signal combining 308 (e.g., assuming there is a digital audio bitstream to combine with). DSP 322 may access memory 302 to obtain one or more signals, e.g., location chirp signals, that may be used for acoustic sampling. DSP 322 may (e.g., periodically) combine the location chirp signal(s)/pattern(s) with the digital audio bitstream (e.g., assuming there is a digital audio bitstream to combine with). By combining test signals (e.g., chirp signals) with a digital audio bitstream, training and/or location detection may be performed while audio is being played by earbud 300. DSP 322 may perform digital anti-clipping 306 after signal combining 308 to generate a digital combined signal. The digital combined signal may be provided to audio IO interface 304 for decoding and conversion to an analog signal. The decoded analog signal may be provided to Spkr1 for transduction to audio waves. For example, if the model indicates the earbud is located out-of-ear, there may not be audio data from host(s) aware that the earbud is located out-of-ear. Signal combining 308 may, effectively, send the chirp signal(s)/pattern(s) alone to audio IO interface 304. Location chirp signals may be provided alone and in combination with a digital audio bitstream, for example, to obtain echo samples for training and for earbud position tracking determination).

DSP 322 may receive from audio TO interface 304 one or more digital bitstreams generated based on a signal generated by FB Mic1. For example, FB Mic 1 may detect audible sounds (e.g., user speech and/or environment sounds other than the user) and inaudible sounds (e.g., echo from location chirp signal(s)). Audio IO interface 304 may separate the signal generated by FB Mic1 into an audible signal and an inaudible signal.

DSP 322 may perform audio filtering 312 on the audible signal. DSP 322 may perform audio processing 314 on the filtered audible signal.

DSP 322 may perform echo filtering 316 on the inaudible signal. DSP 322 may perform echo processing 318 on the filtered inaudible (e.g., echo) signal. For example, DSP 322 may generate a sample for use in determining a location of the earbud. DSP 322 may perform MML model processing 320 on the sample to generate an earbud location classification (e.g., as in-ear or out-of-ear). DSP 322 may provide an indication of the classification in location information to transceiver 324 (e.g., for transmission to host(s)).

Examples shown and discussed with respect to FIGS. 2 and 3 may operate, for example, according to example methods presented in FIGS. 4-7.

Figure 4:
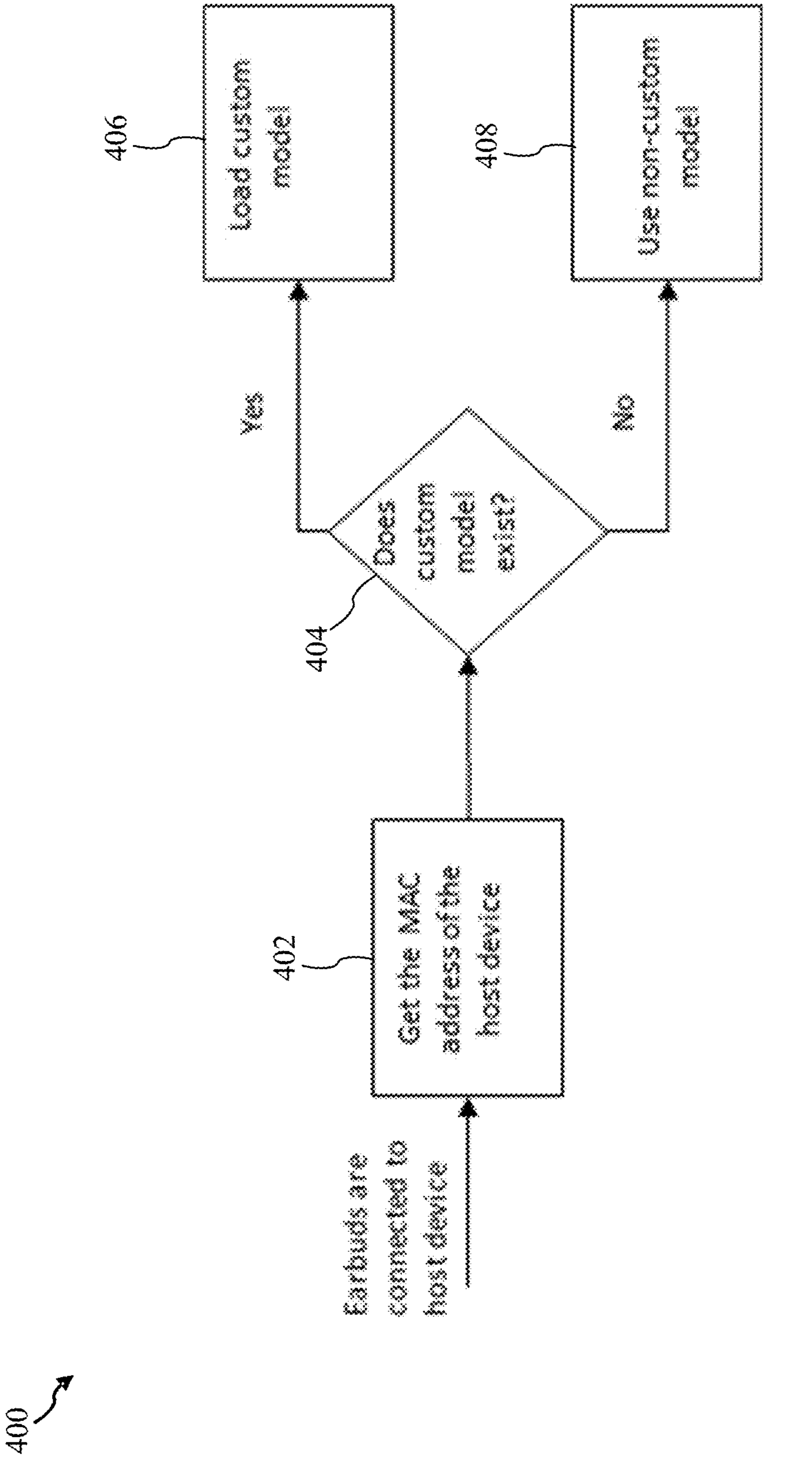
FIG. 4 shows a model selection between a custom model and a non-custom model, according to an example embodiment.

FIG. 4 shows example logic 400 configured to perform a method of model selection between a custom model and a non-custom model, according to an example embodiment. Logic 400 shown in FIG. 4 may be implemented, for example, by locator 216 in FIG. 2. Logic 400 begins with an indication that the earbuds are communicatively coupled to a host device.

As shown in FIG. 4, at 402, the earbud may obtain the medium access control (MAC) address(es) of the host device(es) communicatively coupled to the earbud. In some examples, the earbud may associate a MAC address of a host device with one or more custom models.

At 404, the earbud may associate custom models with MAC addresses of hosts when the custom models are created. The earbud may perform a search to determine whether a custom model exists, for example, for a coupled host with the MAC address.

At 406, the earbud may decide to load a custom (e.g., user-specific) model to determine earbud location based on (e.g., periodic) acoustic sampling, for example, if a custom model is determined to exist at 404.

At 408, the earbud may decide to load a non-custom (e.g., non-user-specific) model to determine earbud location based on (e.g., periodic) acoustic sampling, for example, if a custom model is determined to not exist at 404. For example, the first time a user uses earbuds, or after a factory reset of the earbuds, or after deletion of all MAC addresses of hosts, a non-custom (e.g., default) model may be selected to determine the location of the earbuds.

Figure 5:
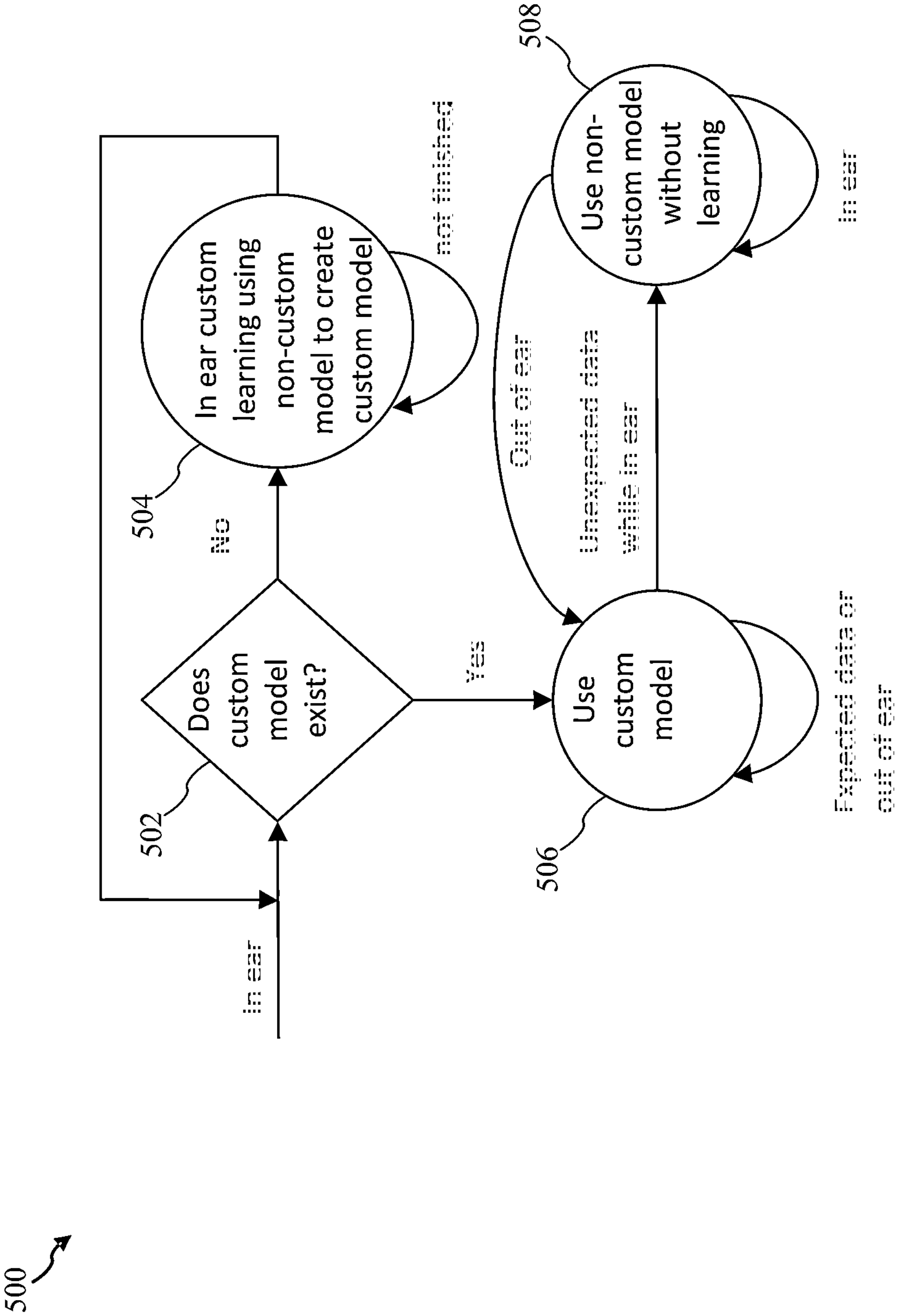
FIG. 5 shows a state diagram for model selection and operating mode selection with and without learning and customization, according to an example embodiment.

FIG. 5 shows an example state diagram logic 500 configured to perform a method of model selection and operating mode selection with and without learning and customization, according to an example embodiment. Logic 500 shown in FIG. 5 may be implemented, for example, by locator 216 in FIG. 2. Logic 500 begins with an indication that the earbuds are located in-ear, e.g., based on a classification by a non-custom model. Logic 500 shows three states: using a custom model 506, using a non-custom model with custom learning to create a custom model 504 and using a non-custom model without custom learning 508. A wide variety of implementations may use more or fewer, the same or different states.

As shown in FIG. 5, the procedure of logic 500 begins with decision 502 to determine whether a custom model exists, such as a custom model associated with a communicatively couple host. The procedure may proceed to state 504 if a custom model does not exist or to state 506 if a custom model does exist.

Figures 6A, 6B:
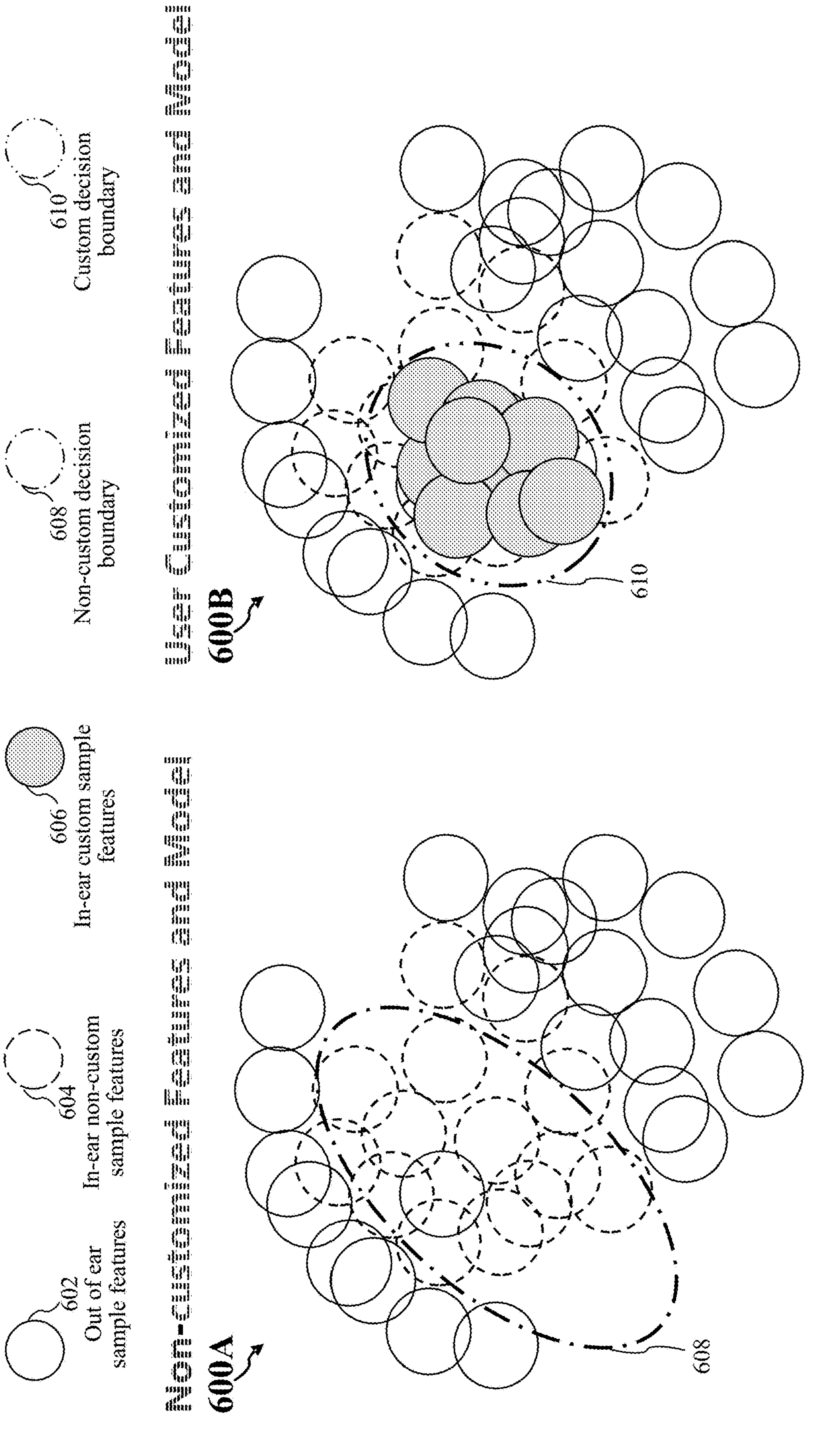
FIGS. 6A and 6B show examples of non-customized and customized feature space and decision-making boundaries for customized and non-customized models, according to embodiments.

In state 504, the non-custom model may continue to be used to determine earbud location while (e.g., also) being used to conduct in-ear custom learning to create a custom model. The procedure may remain in state 504 while custom model creation remains incomplete. State 504 may exit back to decision 502, for example, after the custom model is generated. An example embodiment of using a non-custom model for customized learning is shown in FIGS. 6A and 6B.

In an example implementation of state 504, customized learning may be supervised learning applied to the non-customized model, which may serve as a "ground truth" to develop the customized model. Learning may be divided to several categories or scenarios, such as follows: data captured while music is played; data captured during an audio call; and data captured without an active audio stream (e.g., from a host). These categories or scenarios may be observed in DSP operations shown in FIG. 3. Counters may be used to count the number of examples from each category. As shown in FIGS. 6A and 6B, customized learning may customize the feature space to a specific user to improve the precision and the recall of the model. The data obtained during learning may be used to perform a transfer learning to the non-customized model. The new model (e.g., the custom model) may be saved, for example, when sufficient data (e.g., acoustical in-ear samples) is(are) captured. The custom model may be associated with a MAC address for each host device communicatively coupled to the earbud.

In state 506, the custom model may be used to determine earbud location. The procedure may remain in state 506 as long as expected data (e.g., sampling) is received while the earbud is located in-ear and while the earbud is removed to be located out-of-ear. State 506 may exit to state 508, for example, if unexpected data is received while the earbud is located in-ear. Unexpected data may occur, for example, if the user for which the custom model was created loans the earbud to a friend who may have a significantly different ear canal, which may lead to exceeding a threshold number of out-of-bound acoustical samples (e.g., large mismatch between the model and the data implying the custom model may be unable to accurately predict earbud location for the new user).

In state 508, the non-custom model may be used without learning. By transitioning to state 508 in response to receiving unexpected data when in-ear in state 506, this avoids the use of an incorrect custom model (e.g., a model customized for a different user that the current user) from being used in-ear for a user whose ear caused the unexpected data to be generated. The procedure may remain in state 508, for example, as long as the non-custom model classifies the earbud location as in-ear. State 508 may exit to state 506, for example, if the non-custom model classifies the earbud location as out-of-ear, which may occur, for example, if the friend returns the loaned earbud to the user for which the custom detection model was created.

FIGS. 6A and 6B show examples of non-customized and customized feature space and decision-making boundaries for customized and non-customized models, according to an example embodiment. As described in the key, FIGS. 6A and/or 6B show out-of-ear samples 602, in-ear samples 604, in-ear custom samples 606, a non-custom earbud location determination boundary 608 and a custom earbud location determination boundary 610.

FIG. 6A shows an example of out-of-ear features, non-customized in-ear features, and a non-customized earbud location determination boundary 600A. FIG. 6B shows an example of refinement of the non-customized earbud location determination boundary 600A to customized earbud location determination boundary 600B by refining the training of a non-customized model based on user-specific in-ear custom sample features 606.

The non-custom and custom earbud location determination boundaries 608, 610 may also be referred to as model classification boundaries (e.g., when earbud location is determined by an ML model classifier). Features (e.g., extracted from samples) inside non-custom and custom earbud location determination boundaries 608, 610 may indicate a determination/classification of the location of an earbud as in-ear while features outside non-custom and custom earbud location determination boundaries 608, 610 may indicate determination/classification of the location of an earbud as out-of-ear.

The difference between non-custom earbud location determination boundary 608 and custom earbud location determination boundary 610 (e.g., focused on in-ear custom samples 606) illustrate the benefit(s) provided by model refinement for user-specific classification, such as improved location determination accuracy for each of many earbuds and host devices used by many users, which may extend battery life in many earbuds and host devices.

Figure 7:
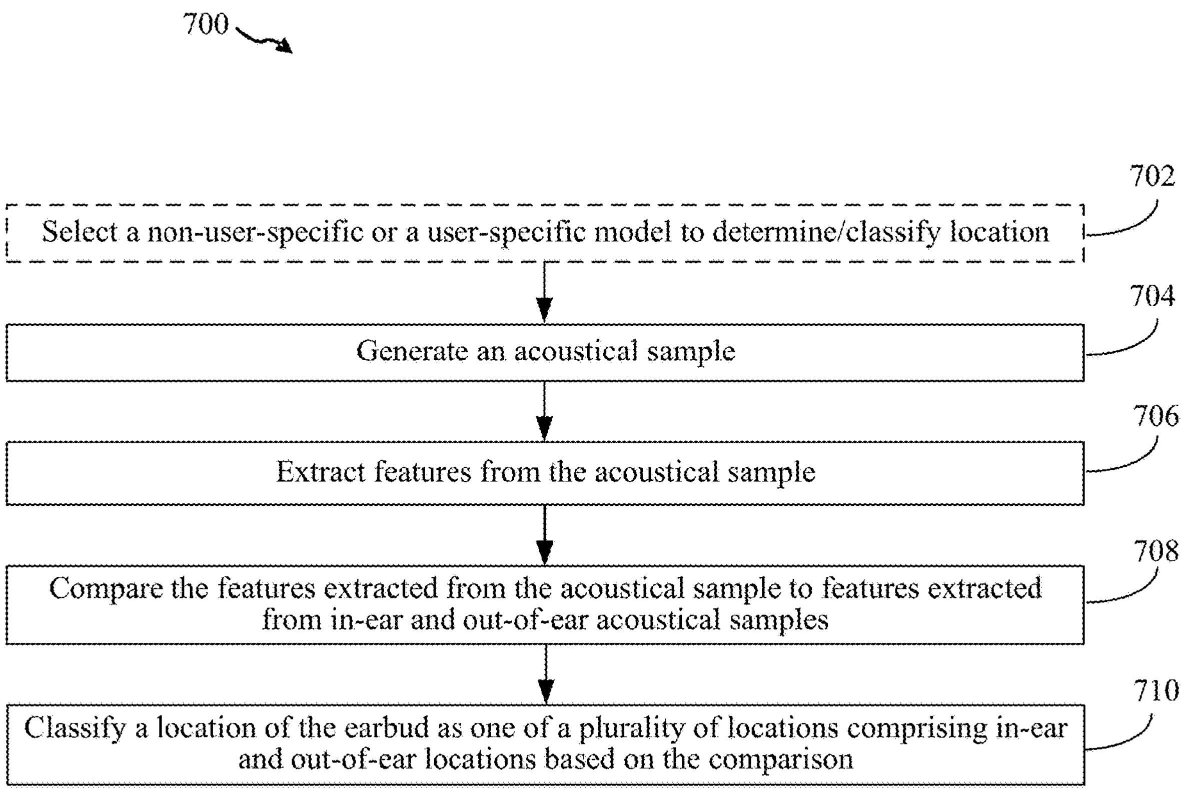
FIG. 7 shows a flowchart of a method for earbud location detection based on an acoustical signature (e.g., with or without user-specific customization), according to an example embodiment.

FIG. 7 shows a flowchart of a method 700 for earbud location detection based on an acoustical signature (e.g., with or without user-specific customization), according to an example embodiment. Embodiments disclosed herein and other embodiments may operate in accordance with example method 700. Method 700 comprises steps 702-710, one or more of which are indicated as optional by dashed lines. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 7. FIG. 7 is simply one of many possible embodiments. Embodiments may implement fewer, more or different steps.

Method 700 may (e.g., optionally) comprise step 702. In step 702, an earbud may select a non-user-specific or a user-specific model to determine/classify a location of the earbud. For example, as shown in FIG. 2, locator 216 (e.g., executed by DSP 210) may select custom model 220 or non-custom model 222, for example, based on model selection examples shown in FIG. 4 and/or FIG. 5. In some examples, earbud location may be determined without a machine learning model. In some examples, earbud location may be detected with one or more models, which may or may not be user-specific (e.g., customized).

In step 704, an acoustical sample may be generated by the earbud. For example, as shown in FIG. 2, locator 216 (e.g., executed by DSP 210) may access memory 214 to process signal(s) 226 in DSP 210 and audio IO interface 212 for output by Spkr1, with echo detection by FB Mic1, processing by audio IO interface 212 and DSP 210 and storage in memory 214 (e.g., in a buffer or cache) by DSP 210.

In step 706, one or more features may be extracted from the acoustical sample. For example, as shown in FIG. 2, the selected model (e.g., custom model 220 or non-custom model 222) or other implementation of earbud location determination may extract one or more features from the acoustical sample.

In step 708, the feature(s) extracted from the acoustical sample may be compared to the feature(s) extracted from (e.g., historical) in-ear and out-of-ear acoustical samples. For example, as shown in FIG. 2, the selected model (e.g., custom model 220 or non-custom model 222) trained on historical features extracted from samples 224 or other implementation of earbud location determination may compare the extracted one or more features from the acoustical sample to one or more features extracted from (e.g., historical) in-ear and out-of-ear acoustical samples 224.

In step 710, the location of the earbud may be classified as one of a plurality of locations comprising in-ear and out-of-ear locations based on the comparison. For example, as shown in FIG. 2, the selected model (e.g., custom model 220 or non-custom model 222) or other implementation of earbud location determination may classify (e.g., determine) the earbud location as one of a plurality of locations comprising in-ear and out-of-ear locations based on the comparison of features in step 708.

III. Example Computing Device Embodiments

As noted herein, the embodiments described, along with any modules, components and/or subcomponents thereof (e.g., earbuds 102*a* and 102*b*, earbud 202, earbud) as well as the flowcharts/flow diagrams described herein (e.g., example method 700), including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
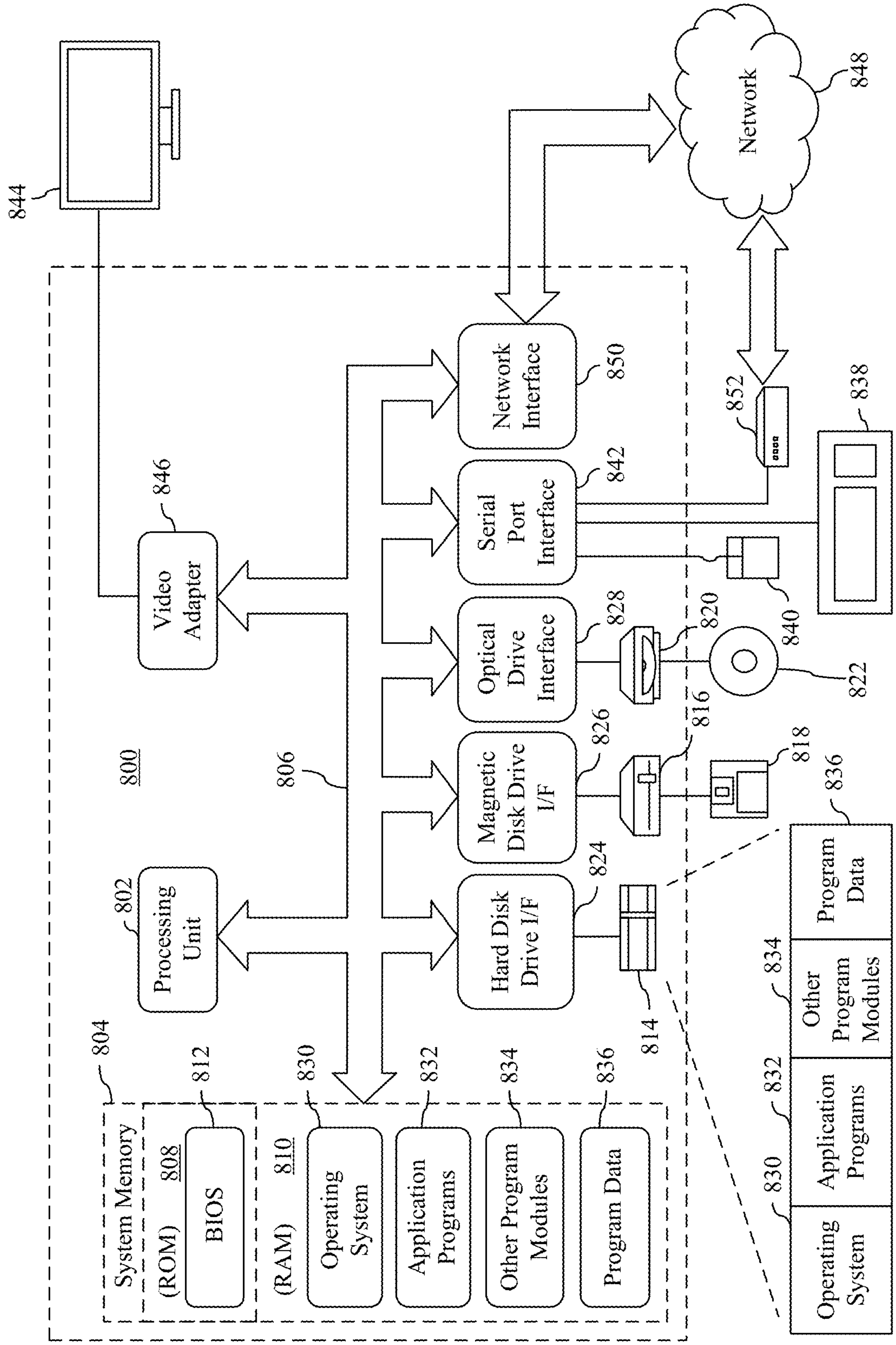
FIG. 8 shows a block diagram of an example computing device that may be used to implement embodiments.

FIG. 8 shows an exemplary implementation of a computing device 800 in which example embodiments may be implemented (e.g., hosts 204A-204N). Consistent with all other descriptions provided herein, the description of computing device 800 is a non-limiting example for purposes of illustration. Example embodiments may be implemented in other types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing example embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of example embodiments described herein. Accordingly, such computer programs represent controllers of the computing device 800.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems, and computer program products are provided for earbud location detection based at least on an acoustical signature with user-specific customization. The location of an earbud may be determined as one of a plurality of locations, such as in-ear and out-of-ear locations, based on a comparison of features extracted from one or more acoustical samples taken by the earbud to features extracted from (e.g., historical, non-user-specific) in-ear and out-of-ear acoustical samples. The determined location may be indicated in a communication to a host device (e.g., smart phone) connected, wirelessly or by wire, to the earbud, e.g., to enable/disable host playback through the earbud. A non-user-specific machine learning (ML) model in the earbud may be selected (e.g., initially) to classify locations of the earbud. The non-user-specific ML model may be trained on features extracted from non-user-specific samples. The non-user-specific ML model may be customized for specific earbud users. User-specific in-ear samples may be collected when the earbud is detected to be in-ear by the non-user-specific model. The non-user-specific ML model may be trained on features extracted from the user-specific in-ear samples to create a user-specific ML model. The user-specific ML model may be associated with one or more host devices that connect to the earbud. The user-specific ML model may be selected to classify a location of the earbud for the associated host(s).

In an example, an earbud may comprise a locator configured to determine a location of the earbud as one of a plurality of locations comprising in-ear and out-of-ear locations based on a comparison of features extracted from an acoustical sample taken by the earbud to features extracted from in-ear and out-of-ear acoustical samples. The earbud may indicate the determined location in a location signal transmitted to a host device communicatively connected to the earbud.

In examples, the in-ear acoustical samples may comprise non-user-specific in-ear acoustical samples for multiple users.

In examples, the locator may be (e.g., further) configured to: perform user-specific in-ear acoustical sampling in an ear of a specific user; and generate user-specific in-ear acoustical samples based on the user-specific in-ear acoustical sampling. The earbud may (e.g., further) comprise: a signal generator to generate a test signal for the in-ear acoustical sampling; a speaker configured to generate a sound wave from the test signal; a feedback microphone configured to detect an echo waveform based on the sound wave in the ear of the specific user; and a signal processor configured to process the echo waveform to generate a user-specific in-ear acoustical sample in the user-specific in-ear acoustical samples.

In examples, a signal combiner may be configured to combine the test signal with an audio stream of music or an audio stream of a phone call received from a host device to generate a combined signal for output. The speaker may be configured to generate a sound wave from the combined signal.

In examples, the earbud may (e.g., further) comprise: a memory storing at least one machine learning (ML) model configured, upon execution, to perform the determination of the location of the earbud. The locator may be (e.g., further) configured to: detect that the earbud is connected to a host device; determine whether the earbud has an ML model associated with the host device; select a user-specific ML model to perform the determination of the location of the earbud if the earbud is determined to have the user-specific ML model associated with the host device; and select a non-user-specific ML model to perform the determination of the location of the earbud if the earbud is determined to hot have the user-specific ML model associated with the host device.

In examples, the locator may be (e.g., further) configured to: detect that the ear-bud is in the ear of a user based on the non-user-specific model; perform in-ear user-specific learning to generate a user-specific acoustic profile while using the non-user-specific ML model to perform the determination of the location of the earbud; and generate the user-specific ML model based on the user-specific acoustic profile generated by the in-ear user specific learning.

In examples, the locator may be (e.g., further) configured to: use the user-specific model while the location of the earbud is determined to be out-of-ear and while the location of the earbud is determined to be in-ear based on expected acoustical samples for the user-specific model; and switch from the user-specific model to the non-user-specific model based on an unexpected acoustical sample while the location of the earbud is determined to be in-ear.

In examples, an ML trainer may be configured to: extract features from the user-specific in-ear acoustical samples, and train the non-user-specific ML model based on the extracted features to generate a user-specific ML model.

In examples, a method performed by an earbud may comprise: generating an acoustical sample; extracting features from the acoustical sample; comparing the features extracted from the acoustical sample to features extracted from in-ear and out-of-ear acoustical samples; and classifying a location of the earbud as one of a plurality of locations comprising in-ear and out-of-ear locations based on the comparison.

In examples, the method may (e.g., further) comprise transmitting the classified location to a host device communicatively coupled to the earbud.

In examples, the in-ear acoustical samples may comprise non-user-specific in-ear acoustical samples for multiple users.

In examples, the in-ear acoustical samples may (e.g., also) comprise user-specific in-ear acoustical samples in an ear of a specific user.

In examples, the method may (e.g., further) comprise performing, by the earbud, user-specific in-ear acoustical sampling to add the user-specific in-ear acoustical samples to the non-user-specific in-ear acoustical samples.

In examples, performing the user-specific in-ear acoustical sampling may comprise: performing the user-specific in-ear acoustical sampling during an audio stream of music output through a speaker in the earbud; performing the user-specific in-ear acoustical sampling during an audio stream of a phone call output through the speaker in the earbud and during voice detection by a microphone in the earbud; and performing the user-specific in-ear acoustical sampling without an audible audio stream.

In examples, the method may (e.g., further) comprise generating the user-specific in-ear samples by: emitting an inaudible acoustical waveform from the speaker in the earbud; detecting an inaudible echo waveform using a feedback microphone in the earbud; and processing the inaudible echo waveform into the user-specific in-ear samples.

In examples, the method may (e.g., further) comprise: detecting that the earbud is connected to a host device; determining whether the earbud has a machine learning (ML) model associated with the host device; performing the classifying with the user-specific ML model if the earbud is determined to have the user-specific ML model associated with the host device; and performing the classifying with a non-user-specific ML model if the earbud is determined to hot have the user-specific ML model associated with the host device.

In examples, the method may (e.g., further) comprise: detecting that the earbud is in the ear of a user based on the non-user-specific model; performing in-ear user-specific learning to generate a user-specific acoustic profile while using the non-user-specific ML model to perform the classifying; and generating the user-specific ML model based on the user-specific acoustic profile generated by the in-ear user specific learning.

In examples, the method may (e.g., further) comprise: using the user-specific model while the location of the earbud is classified as out-of-ear and while the location of the earbud is classified as in-ear based on expected acoustical samples for the user-specific model; and switch from the user-specific model to the non-user-specific model based on an unexpected acoustical sample while the location of the earbud is classified as in-ear.

In examples, a computer-readable storage medium may have program instructions recorded thereon that, when executed by a processing circuit, perform a method. The method may comprise selecting a non-user-specific machine learning (ML) model in the earbud to classify a location of the earbud as one of a plurality of locations comprising in-ear and out-of-ear locations based on features extracted from an acoustical sample taken by the earbud, wherein the non-user-specific ML model is trained on features extracted from non-user-specific in-ear and out-of-ear acoustical samples.

In examples, the method may (e.g., further) comprise: detecting that the earbud is in the ear of a user based on the non-user-specific model; performing in-ear user-specific learning to generate user-specific in-ear samples; and training the non-user-specific ML model based on features extracted from the user-specific in-ear samples to generate a user-specific ML model; and selecting the user-specific ML model in the earbud to classify a location of the earbud as one of a plurality of locations comprising in-ear and out-of-ear locations.

In an example, an earbud may comprise a memory that stores a machine learning (ML) model; a transceiver configured to communicate with a host device to receive digital audio data; an analog channel configured to convert the digital audio data to an analog audio signal; an ML trainer configured to extract features from the digital audio data, and train the ML model according to the extracted features; an in-ear classifier configured to use the ML model to determine whether the ear bud is located in an ear of a user, and generate an earbud location signal in response to the determination by the ML model; and a speaker configured to receive the analog audio signal, and broadcast sound based on the analog audio signal in response to the earbud location signal indicating the earbud is located in the ear of the user.

V. Conclusion

While various embodiments of the present invention have been described above, it should be understood that they have been presented by way of example only, and not limitation.

It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. An earbud, comprising:
a locator configured to:
determine a location of the earbud as one of a plurality of locations comprising in-ear and out-of-ear locations based on a comparison of features extracted from an acoustical sample taken by the earbud to features extracted from in-ear and out-of-ear acoustical samples; and
indicate the determined location in a location signal transmitted to a host device communicatively connected to the earbud.

2. The earbud of claim 1, wherein the in-ear acoustical samples comprise non-user-specific in-ear acoustical samples for multiple users.

3. The earbud of claim 1,
wherein the locator is further configured to:
perform user-specific in-ear acoustical sampling in an ear of a specific user; and
generate user-specific in-ear acoustical samples based on the user-specific in-ear acoustical sampling; and
wherein the earbud further comprises:
a signal generator to generate a test signal for the in-ear acoustical sampling;
a speaker configured to generate a sound wave from the test signal;
a feedback microphone configured to detect an echo waveform based on the sound wave in the ear of the specific user; and
a signal processor configured to process the echo waveform to generate a user-specific in-ear acoustical sample in the user-specific in-ear acoustical samples.

4. The earbud of claim 3, further comprising:
a signal combiner configured to combine the test signal with an audio stream of music or an audio stream of a phone call received from a host device to generate a combined signal for output; and
wherein the speaker is configured to generate a sound wave from the combined signal.

5. The earbud of claim 1, further comprising:
a memory storing at least one machine learning (ML) model configured, upon execution, to perform the determination of the location of the earbud;
wherein the locator is further configured to:
detect that the earbud is connected to a host device;
determine whether the earbud has an ML model associated with the host device;
select a user-specific ML model to perform the determination of the location of the earbud if the earbud is determined to have the user-specific ML model associated with the host device; and
select a non-user-specific ML model to perform the determination of the location of the earbud if the earbud is determined to not have the user-specific ML model associated with the host device.

6. The earbud of claim 5,
wherein the locator is further configured to:
detect that the ear-bud is in the ear of a user based on the non-user-specific model;
perform in-ear user-specific learning to generate a user-specific acoustic profile while using the non-user-specific ML model to perform the determination of the location of the earbud; and
generate the user-specific ML model based on the user-specific acoustic profile generated by the in-ear user specific learning.

7. The earbud of claim 5,
wherein the locator is further configured to:
use the user-specific model while the location of the earbud is determined to be out-of-ear and while the location of the earbud is determined to be in-ear based on expected acoustical samples for the user-specific model; and
switch from the user-specific model to the non-user-specific model based on an unexpected acoustical sample while the location of the earbud is determined to be in-ear.

8. The earbud of claim 5, further comprising:
an ML trainer configured to:
extract features from the user-specific in-ear acoustical samples, and
train the non-user-specific ML model based on the extracted features to generate a user-specific ML model.

9. A method performed by an earbud, comprising:
generating an acoustical sample;
extracting features from the acoustical sample;
comparing the features extracted from the acoustical sample to features extracted from in-ear and out-of-ear acoustical samples; and
classifying a location of the earbud as one of a plurality of locations comprising in-ear and out-of-ear locations based on the comparison.

10. The method of claim 9, further comprising:
transmitting the classified location to a host device communicatively coupled to the earbud.

11. The method of claim 9, wherein the in-ear acoustical samples comprise non-user-specific in-ear acoustical samples for multiple users.

12. The method of claim 11, wherein the in-ear acoustical samples also comprise user-specific in-ear acoustical samples in an ear of a specific user.

13. The method of claim 12, further comprising:
performing, by the earbud, user-specific in-ear acoustical sampling to add the user-specific in-ear acoustical samples to the non-user-specific in-ear acoustical samples.

14. The method of claim 13, wherein performing the user-specific in-ear acoustical sampling comprises:
performing the user-specific in-ear acoustical sampling during an audio stream of music output through a speaker in the earbud;
performing the user-specific in-ear acoustical sampling during an audio stream of a phone call output through the speaker in the earbud and during voice detection by a microphone in the earbud; and
performing the user-specific in-ear acoustical sampling without an audible audio stream.

15. The method of claim 14, further comprising:
generating the user-specific in-ear samples by:
emitting an inaudible acoustical waveform from the speaker in the earbud;
detecting an inaudible echo waveform using a feedback microphone in the earbud; and
processing the inaudible echo waveform into the user-specific in-ear samples.

16. The method of claim 11, further comprising:

detecting that the earbud is connected to a host device;

determining whether the earbud has a machine learning (ML) model associated with the host device;

performing the classifying with the user-specific ML model if the earbud is determined to have the user-specific ML model associated with the host device; and performing the classifying with a non-user-specific ML model if the earbud is determined to not have the user-specific ML model associated with the host device.

17. The method of claim 16, further comprising:

detecting that the earbud is in the ear of a user based on the non-user-specific model;

performing in-ear user-specific learning to generate a user-specific acoustic profile while using the non-user-specific ML model to perform the classifying; and generating the user-specific ML model based on the user-specific acoustic profile generated by the in-ear user specific learning.

18. The method of claim 16, further comprising:

using the user-specific model while the location of the earbud is classified as out-of-ear and while the location of the earbud is classified as in-ear based on expected acoustical samples for the user-specific model; and switch from the user-specific model to the non-user-specific model based on an unexpected acoustical sample while the location of the earbud is classified as in-ear.

19. A non-transitory computer-readable storage medium having program instructions recorded thereon that, when executed by a processing circuit, perform a method comprising:

selecting a non-user-specific machine learning (ML) model in the earbud to classify a location of the earbud as one of a plurality of locations comprising in-ear and out-of-ear locations based on features extracted from an acoustical sample taken by the earbud, wherein the non-user-specific ML model is trained on features extracted from non-user-specific in-ear and out-of-ear acoustical samples.

20. The non-transitory computer-readable storage medium of claim 19, the method further comprising:

detecting that the earbud is in the ear of a user based on the non-user-specific model;

performing in-ear user-specific learning to generate user-specific in-ear samples; and training the non-user-specific ML model based on features extracted from the user-specific in-ear samples to generate a user-specific ML model; and selecting the user-specific ML model in the earbud to classify a location of the earbud as one of a plurality of locations comprising in-ear and out-of-ear locations.

* * * * *